United States Patent
Gautama et al.

(10) Patent No.: US 12,337,687 B2
(45) Date of Patent: Jun. 24, 2025

(54) AUDIO ALERT GENERATION METHOD AND APPARATUS

(71) Applicant: NXP B.V., Eindhoven (NL)

(72) Inventors: Temujin Gautama, Boutersem (BE); Christophe Marc Macours, Hodelge (BE); Bernard Kuhn, Mühldorf am Inn (DE)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 18/310,642

(22) Filed: May 2, 2023

(65) Prior Publication Data

US 2023/0356593 A1    Nov. 9, 2023

(30) Foreign Application Priority Data

May 6, 2022   (EP) .................................... 22172061

(51) Int. Cl.
*H04R 3/00* (2006.01)
*B60K 35/00* (2006.01)
*B60K 35/26* (2024.01)

(52) U.S. Cl.
CPC ............... *B60K 35/00* (2013.01); *H04R 3/00* (2013.01); *B60K 35/26* (2024.01); *H04R 2499/13* (2013.01)

(58) Field of Classification Search
CPC .......... B60K 35/00; B60K 35/26; G08B 3/10; H04R 2499/13; H04R 3/00
See application file for complete search history.

(56) References Cited

U.S. PATENT DOCUMENTS

| | | | |
|---|---|---|---|
| 10,012,691 B1 * | 7/2018 | Zhou ................... | G01R 31/2856 |
| 10,255,034 B2 | 4/2019 | Gautama et al. | |
| 11,120,642 B2 | 9/2021 | Rapeta et al. | |
| 2017/0064442 A1 * | 3/2017 | Kirsch ..................... | H04R 3/00 |
| 2017/0294888 A1 * | 10/2017 | Berkhout .............. | H03F 3/2175 |
| 2017/0302432 A1 * | 10/2017 | Kroeger ................. | H04H 40/00 |
| 2019/0139399 A1 | 5/2019 | Chellappan et al. | |

FOREIGN PATENT DOCUMENTS

EP      3382663 A1    10/2018

OTHER PUBLICATIONS

Knapp et al., "The Generalized Correlation Method for Estimation of Time Delay," IEEE Transactions on Acoustics, Speech, and Signal Processing, vol. ASSP-24, No. 4, Aug. 1976, 8 pages.

* cited by examiner

*Primary Examiner* — Omer S Khan

(57) ABSTRACT

A method of generating an audible alert by a digital audio system configured to operate in a first operating mode and a second operating mode is described. An alert signal is generated or received. One or more segments of the generated or received alert signal is processed. The processed alert signal is then analysed to define the operating mode of the digital audio system. In the first operating mode, the alert output signal includes at least the alert signal. In the second operating mode, the alert output signal includes at least the processed alert signal.

19 Claims, 6 Drawing Sheets

350

AUDIO ALERT GENERATION METHOD AND APPARATUS

FIELD

This disclosure describes a system and method for audio alert generation.

BACKGROUND

In a safety-critical environment, auditive warning signals are often crucial elements to alert the user. There are several recommendations and standards describing the requirements of safety-critical systems for example IEC61508, ISO26262. In an automotive context, where elaborate audio subsystems are becoming a very prominent feature due to the growing importance of in-car infotainment, the existing audio system including loudspeakers, amplifiers, microphones, signal enhancement may be used to generate user alerts. However, for safety-critical user alerts, this would require the inclusion of the complete infotainment subsystem into the tightly-controlled safety chain, spanning not only the loudspeakers and amplifiers, but also, and more importantly, the hardware platforms where digital signal processing is performed in the audio chain. Since this may result in a considerable investment in the development of the audio subsystem and of all the software modules and hardware platforms involved, it is typical to use a dedicated, separate and smaller audio subsystem, comprising a micro-controller for generating the alert with little or no digital signal processing, an amplifier and a loudspeaker.

This safety-controlled dedicated audio subsystem can be positioned, e.g., under the instrumentation panel, which leads to size constraints, and consequently, the combination of a single amplifier with a single small loudspeaker is used.

SUMMARY

Various aspects of the disclosure are defined in the accompanying claims. In a first aspect there is provided a method of generating an audible alert by a digital audio system configured to operate in a first operating mode and a second operating mode, the method comprising: generating or receiving an alert signal; generating a processed alert signal by processing at least a segment of the alert signal; analysing the processed alert signal to define whether the digital audio system operates in the first operating mode or the second operating mod; and in the first operating mode, generating an alert output signal comprising the alert signal; and in the second operating mode, generating an alert output signal comprising the processed alert signal.

In one or more embodiments, generating the alert output signal may further comprise combining the alert signal and the processed alert signal.

In one or more embodiments, generating the alert output signal may further comprise generating a first alert signal segment and a second alert signal segment, and generating the processed alert signal comprises processing the second alert signal segment.

In one or more embodiments, the method may further comprise at least one of (i) delaying the alert signal before the analysing and combining, and (ii) delaying the alert signal and the processed alert signal before the combining.

In one or more embodiments, analysing the processed alert signal may further comprise determining a validity of the processed alert signal.

In one or more embodiments, the method may further comprise determining a validity of the processed alert signal from a comparison of the processed alert signal and the alert signal.

In one or more embodiments, the method may further comprise determining the validity of the processed alert signal from the cross-correlation of the alert signal and the processed alert signal.

In one or more embodiments, generating a processed alert signal may further comprise replacing at least one bit in a sample of the alert signal with a parity bit, and wherein determining a validity of the processed alert signal comprises checking the parity of the alert signal sample.

In one or more embodiments, the method may further comprise configuring the digital audio system in the first operating mode in response to determining that the processed alert signal is invalid, and configuring the digital audio system in the second operating mode in response to determining that the processed alert signal is valid.

In one or more embodiments, the audio system may comprise a first system partition configured to operate at least in the first operating mode and a second system partition, and the method may further comprise: generating or receiving the alert signal in the first system partition; generating the processed alert signal in the second system partition; analysing the processed alert signal in the first system partition; generating the alert output signal in the first system partition.

In a second aspect, there is provided digital audio system configured to operate in a first operating mode and a second operating mode, the digital audio system comprising: an alert signal generator configured to generate an alert signal; a processor coupled to the alert signal generator and configured to generate an processed alert signal by processing at least a segment of the alert signal; an analyser coupled to the processor and the alert signal generator and configured to analyse the processed alert signal to define whether the digital audio system operates in the first operating mode or the second operating mode; and a combiner coupled to the processor, the alert signal generator and the analyser, the combiner configured in the first operating mode to output an alert output signal comprising the alert signal, and in the second operating mode to output an alert output signal comprising the processed alert signal.

In one or more embodiments, the digital audio system may comprise a first system partition and a second system partition, wherein the alert signal generator, the analyser and the combiner are located in the first system partition and the processor is located in the second system partition.

In one or more embodiments, the combiner may be further configured to combine the alert signal and the processed alert signal, and to output an alert output signal comprising the combined alert signal and processed alert signal.

In one or more embodiments, the digital audio system may comprise: a first delay module arranged between the alert signal generator output and the combiner and analyser and configured to delay the alert signal before the analysing and combining.

In one or more embodiments, the alert signal generator may comprise a first alert signal generator output coupled to the combiner and a second alert signal generator output coupled to the processor and wherein the alert signal comprises a first alert signal segment and a second alert signal segment wherein the alert signal generator is configured to output the first alert signal segment followed by the second alert signal segment on the first alert signal generator output and to output the second alert signal segment on the second alert signal generator output.

In one or more embodiments, the digital audio system may comprise: a second delay module arranged between the first delay module and the combiner; and a third delay module arranged between a processor output and the combiner.

In one or more embodiments, the analyser may be further configured to determine a validity of the processed alert signal.

In one or more embodiments, the digital audio system may be further configured to determine the validity of the processed alert signal from a cross-correlation of the alert signal and the processed alert signal.

In one or more embodiments, the processor may be further configured to generate an processed alert signal by adding a parity bit to a processed alert signal sample and to determine the validity of the processed alert signal by a parity check of the processed alert signal sample.

In a third aspect, there is provided a non-transitory computer readable media comprising a computer program comprising computer executable instructions which, when executed by a processor in a digital audio system configured to operate in a first operating mode and a second operating mode, causes the processor to perform a method for generating an audible alert, the method comprising: generating or receiving an alert signal; generating a processed alert signal by processing at least a segment of the alert signal; analysing the processed alert signal to define whether the digital audio system operates in the first operating mode or the second operating mode; and in the first operating mode, generating an alert output signal comprising the alert signal; and in the second operating mode, generating an alert output signal comprising the processed alert signal.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
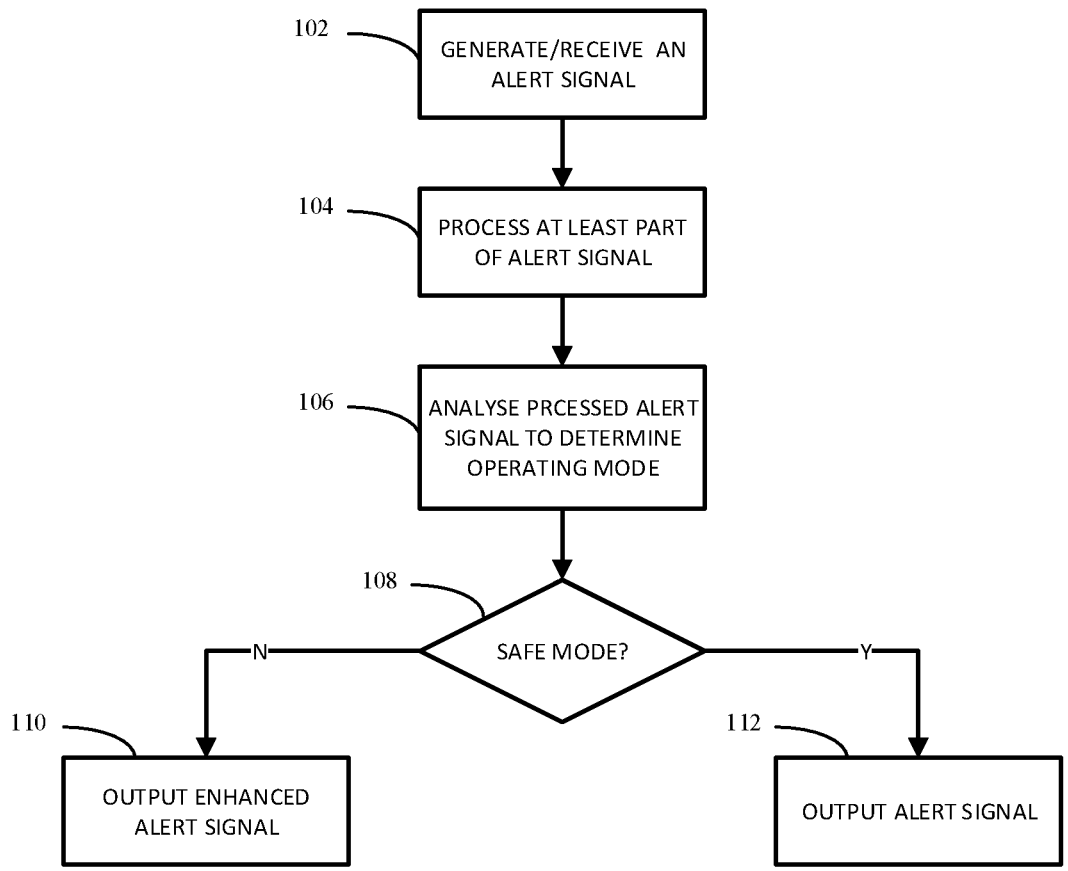
FIG. 1 shows a method of generating an audio alert according to an embodiment.

FIG. 1 shows a method of generating an audio alert 100 by an audio system according to an embodiment. In step 102 and alert signal may be generated. In step 104 at least part of the alert signal that is generated in step 102 may be processed. In step 106, the process alert signal may be analysed to determine an operating mode. In some examples, a first operating mode might be termed to be a safe mode or fail safe mode of operation of the audio system. In some examples the second operating mode might be termed to be a normal operating mode of an audio system. In step 108 a check of the operating mode may be made. If the operating mode is a safe mode (or first operating mode), then in step 112, the alert signal generated in step 102 may be directly output to a loudspeaker by an amplifier. Otherwise, in step 110 the processed or enhanced alert signal may be output to one or more loudspeakers via one or more amplifiers.

Figure 2:
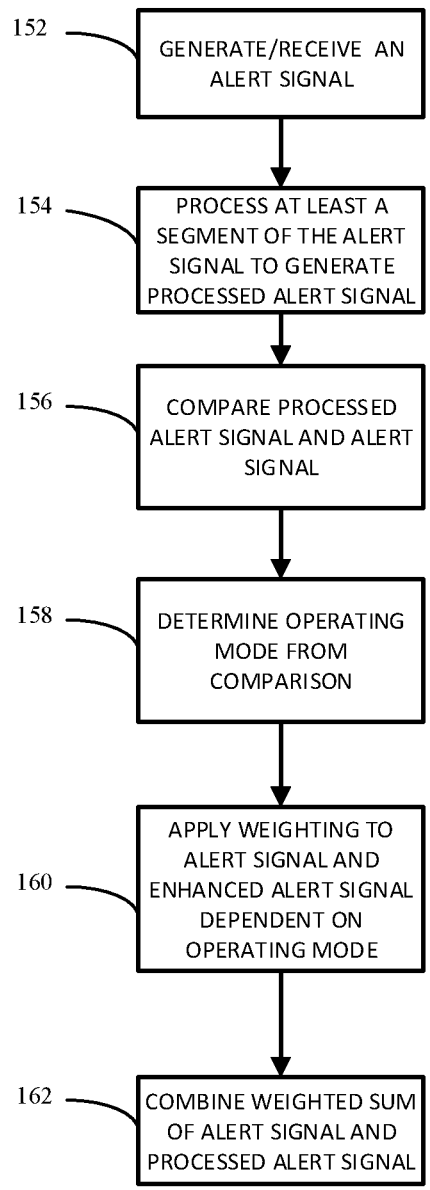
FIG. 2 illustrates a method of generating an audio alert according to an embodiment.

FIG. 2 shows a method of generating an audio alert 150 by an audio system according to an embodiment. In step 152 an alert signal may be generated. In step 154 the alert signal may be processed to generate a processed alert signal. In step 156 the processed alert signal may be compared to the alert signal. In some examples this may be done by a cross-correlation of the processed alert signal with the alert signal. However, it will be appreciated that other methods of comparison may be used. In step 158 an operating mode may be determined from the comparison. For example if the result of the comparison indicates that the processed alert signal has been somehow corrupted, then the operating mode may be considered to be in a first operating mode. Alternatively if the result of the comparison indicates that the processed alert signal has not been corrupted, then the operating mode may be considered to be in a second operating mode. A weighting factor may be applied in step 160, dependent on the operating mode. The processed alert signal and the alert signal may be combined with the weighting factor in step 162. For example in the first operating mode the weighting factors may be selected such that the combination of the signal may entirely or almost entirely consist of the alert signal generated in step 152, since the enhanced alert signal is considered to be corrupted, i.e. invalid. In the second operating mode, the weighting factors may be selected such that the combination of the signal may entirely or mostly consist of the processed alert signal generated in step 154, since the enhanced alert signal is valid.

The method 150, 152 allows an audio system such as for example an infotainment system typically implemented in cars and other vehicles to provide audio enhanced and tuned alerts for example by including cabin equalisation, with a fallback mode to ensure the user alert is always played even if part of the system fails. This may avoid the use of for example a dedicated safety-controlled instrument cluster audio subsystem.

Figure 3:
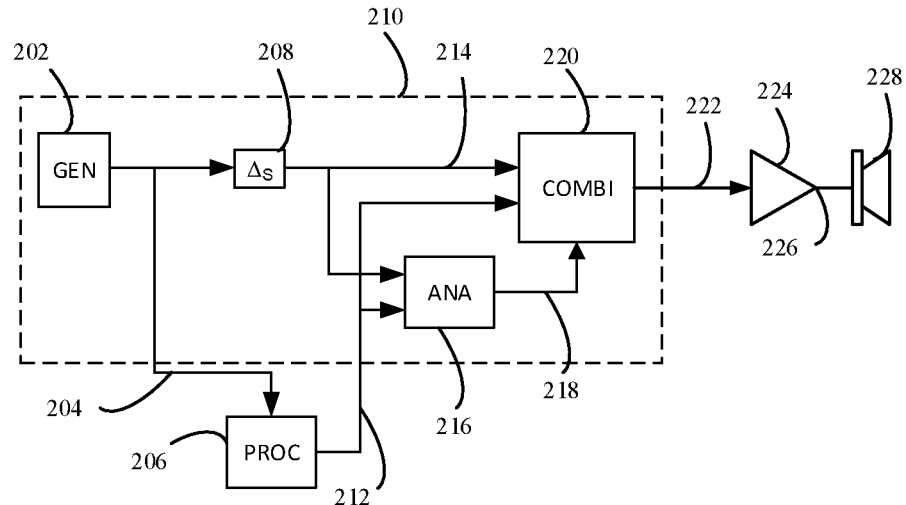
FIG. 3 shows an audio system for generating an audio alert according to an embodiment.

FIG. 3 shows a digital audio system for generating an audio alert 200 according to an embodiment. The digital audio system may include an alert signal generator 202, a processor 206, a delay module 208, an analyser 216, and a combiner 220. The alert signal generator, the delay module 208, the analyser 216, and the combiner 220 may be located in a first system partition 210, which may also be referred to as the safe partition. The processor 206 may be located in a second system partition. An alert signal generator output 204 may be connected to an input of the processor 206 and an input of the delay module 208. The delay module output 214 may be connected to a first input of the combiner 220 and a first input of the analyser module 216. The processor output 212 may be connected to a second input of the analyser module 216 and a second input of the combiner 220. An analyser module output 218 may be connected to a control input of the combiner 220. The combiner output 222 may be connected via a digital to analog converter (not shown) to an amplifier 224. The amplifier output 226 may be connected to a loudspeaker 228.

In operation, a user alert signal which may for example be a chime may be generated by the alert signal generator 202. This signal may also be referred to as a basic chime. The alert signal is provided to the audio processor 206, that is outside the safe partition 210. The audio processor 206 may apply signal enhancement. The processed user alert which may also be referred to as the enhanced user alert is output from the audio processor output 212 to the analyser module 216. The user alert signal may also be provided to the analyser module 216. Optionally the user alert signal is time-delayed by an amount $\Delta_S$ by the delay module 208 which is equivalent to the expected time to process the user alert by the audio processor 206. The analyser module 216 may compute a consistency measure which may also be referred to as a validity measure, which is a measure that indicates whether the enhanced user alert is intact.

If the non-safe partition has crashed, the enhanced chime may consist of a single constant value or of random noise.

One possible consistency or validity measure is the peak of the (absolute value of the) cross-correlation between the basic chime and the enhanced chime. Indeed, in the absence of processing and of an additional audio signal, the peak should be unity, and with functional processing, it should remain high, say above 0.8. In other examples, other cross-correlation measures, such as the phase-transform based cross-correlation may be used.

In some examples, the processed alert signal may be mixed with concurrent audio content by the processor 206. In these examples the peak value of the cross-correlation may decrease. However, because the alert signal, for example a chime is typically substantially louder than the concurrent audio content, the cross-correlation is still a reliable consistency measure in the presence of concurrent audio, and should remain above a value for example 0.6 to indicate a subjectively intact enhanced chime.

If information is available regarding the proper functioning of the non-safe partition, at least with respect to the processing of the chime, this information may replace the consistency measure, and the analysis module is not required.

Alternatively, in some examples, the validity of the audio processing in the non-safe partition can be evaluated using a parity check as consistency measure. If a parity bit is added to the processed alert signal in the non-safe partition at the end of the non-safe processing chain, the validity of this parity bit can be assessed in the safe partition 210. The validity of the parity bit which may be averaged across the most recent samples can then be checked in the safe partition to indicate whether the processed alert signal is valid i.e. intact. The parity bit may be computed on all but the least significant bit of the audio samples, and may be stored in the least significant bit of an audio sample. The parity bit may be determined for each sample, or after each block of N samples. Replacing the least significant bit every N samples may reduce the distortion in the audio. The parity bit may also be added to the processed alert signal when it includes other audio content. Since the parity bit is added at the end of the processing chain and hence, after the addition of the concurrent audio content, any parity error will indicate a corruption of the processed alert signal.

Alternatively, in other examples other bit patterns can be stored in the least-significant bit positions, e.g., a fixed alternating 0/1 bit pattern, or a code that is derived from the samples other than parity, such as a scrambled version of another bit of the samples.

If the validity measure indicates that the processed user alert is invalid, then the audio system 200 may be considered to be in a first mode of operation which may be considered as a safe mode. A processed user alert may be considered invalid if it is corrupted to such an extent that it would no longer have the expected impact on the listener, i.e. the listener would not perceive the signal as a user alert, which may be important in a safety-critical situation. If the validity measure indicates that the processed user alert is valid, then the audio system 200 may be considered to be in a second mode of operation which may be considered as a normal mode. The validity measure effectively defines the operating mode of the audio system 200. The validity measure is output to the combination module 220 which also receives the delayed basic user alert signal and the possibly corrupted processed user alert signal. The combination module 220 may either combine the two signals or select one of the two signals dependent on the validity measure, and the resulting alert output signal may be provided to the amplifier 224 and loudspeaker 228. In some examples the combination may be a simple selection, for example only the basic alert signal is output if the processed alert signal is invalid and only the processed alert signal is output if the processed alert signal is valid. In some examples, the signals may be combined as a weighted sum of the alert signal and the processed alert signal.

In some examples, information may be available regarding the functionality of the non-safe partition, i.e. the part of the system not located in the safe partition 210. In these examples, the analyser module 216 may be omitted, and the information regarding the functionality of the non-safe partition may be used as the validity measure.

Figure 4:
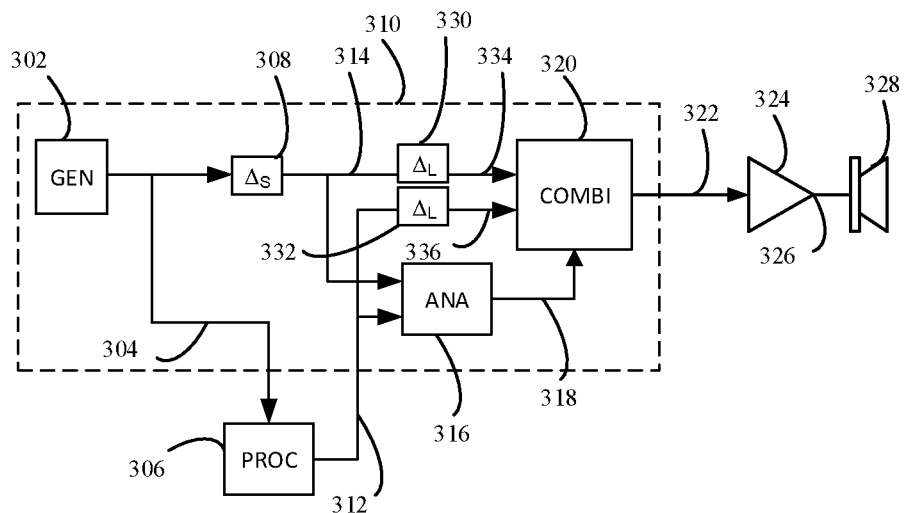
FIG. 4 illustrates an audio system for generating an audio alert according to an embodiment.

FIG. 4 shows a digital audio system for generating an audio alert 300 according to an embodiment. The digital audio system may include an alert signal generator 302, processor 306, a first delay module 308, a second delay module 330, a third delay module 332, an analyser 316, and a combiner 320. The alert signal generator, the delay module 208, the analyser 316, and the combiner 320 may be located in a first system partition 310. The processor 306 may be located in a second system partition.

An alert signal generator output 304 may be connected to an input of the processor 306 and an input of the first delay module 308. The first delay module output 314 may be connected to an input of the second delay module 330 and a first input of the analyser module 316. The output 334 of the second delay module 330 may be connected to a first input of the combiner 320.

The processor output 312 may be connected to an input of the third delay module 332 and second input of the analyser module 316. The output 336 of the third delay module 332 may be connected to a second input of the combiner 320. An output 318 of the analyser module 316 may be connected to a control input of the combiner 320. The combiner output 322 may be connected via a digital to analog converter (not shown) to an amplifier 324. The amplifier output 326 may be connected to a loudspeaker 328.

In operation, the function of the digital audio system 300 is similar to digital audio system 200. A second delay time $\Delta_L$ is added to the user alert signal by second delay module 330, which has already been delayed by first delay module 308 by a time $\Delta_S$. A second delay time $\Delta_L$ is added to the processed user alert by third delay module 332. This allows for a look-ahead mechanism, so that the combination module 320 can anticipate a change in consistency to reduce audible artifacts during transitions by, for example, transitioning from processed user alert to basic user alert before a corrupted segment of the delayed processed user alert reaches the combination module 320.

Figure 5:
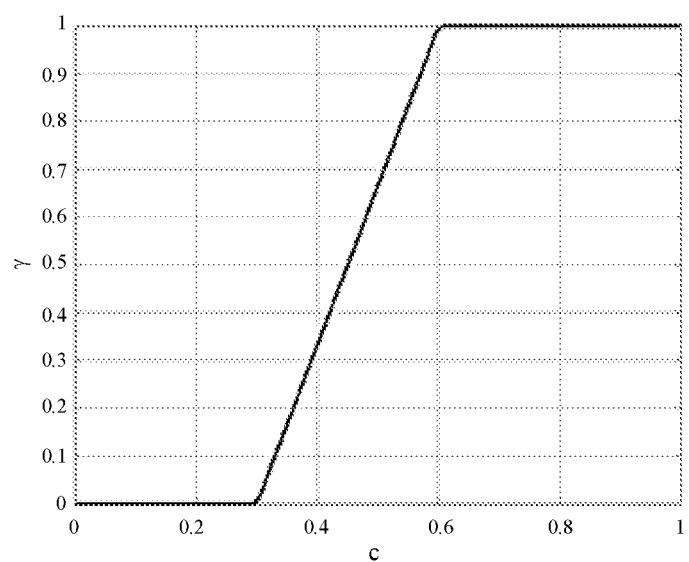
FIG. 5 shows a graph illustrating an example variation of the weighting factor or gain factor versus the validity measure value.

In some examples of digital audio systems 200, 300, the combiners 220, 320 may select the processed chime if the validity measure exceeds a certain threshold. In some examples, the combiners 220, 320 may combine the user alert and the processed user alert as a weighted combination according to:

$$s_{out} = \gamma s_e + (1-\gamma)s_b$$

Where $s_{out}$ is the output signal, $s_e$ is the processed (enhanced) alert signal and $s_b$ is the (basic) alert signal output where $\gamma$ is a weighting factor that is related to the validity measure which may also be considered as a consistency measure, c. In some examples, the combiners 220, 320 may combine the user alert signal and processed user alert signal according to the graph 350 of FIG. 5 which shows the weighting factor or gain $\gamma$ on the y-axis varying between 0 and 1 and the normalized validity measure c on the x-axis varying between 0 and 1. Below a first threshold value for c, the enhanced chime is presumed corrupt, and $\gamma$ is zero, due to which the basic chime is output. Above a second threshold for c, the enhanced chime is presumed intact, and $\gamma$ is unity, due to which the enhanced chime is output. In an uncertainty region which as illustrated in FIG. 3 may be for example between 0.3 and 0.6, a combination of the two chimes is output. The weighting factor $\gamma$ can also be asymmetrically temporally smoothed to reduce transition artifacts, e.g., by using a fast time constant for example between 50 milliseconds and 100 milliseconds to decrease to 0 (to play the basic alert signal), and a slower time constant, for example 0.5 seconds, to increase to 1 (to play the processed alert signal).

In another example, the weighted combination of the basic chime, $s_b$, and the enhanced chime, $s_e$, can be constructed in the frequency domain by taking the weighted combination of the magnitude spectrum, and the phase spectrum of the weighted combination in the time domain. This may prevent an attenuation of the signal output when the basic alert signal and the processed alert signal are not phase-aligned.

Figure 6:
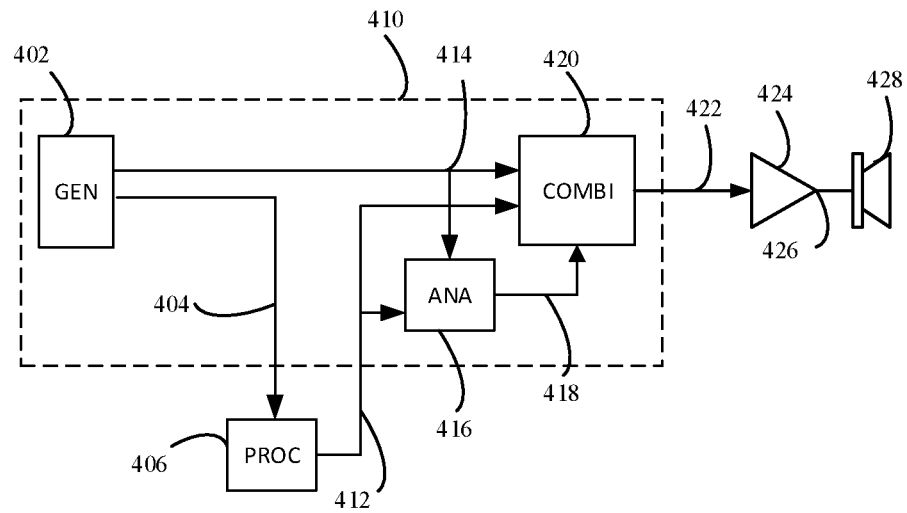
FIG. 6 shows an audio system for generating an audio alert according to an embodiment.

FIG. 6 shows a digital audio system for generating an audio alert 400 according to an embodiment. The digital audio system may include an alert signal generator 402, processor 406, an analyser 416, and a combiner 420. The alert signal generator 402, the analyser 416, and the combiner 420 may be located in the first system partition 410. The processor 406 may be located in a second system partition. A first alert signal generator output 414 may be connected to an input of the combiner 420 and a first input of the analyser module 416. A second alert signal generator output 404 may be connected to an input of the processor 406. The processor output 412 may be connected to a second input of the analyser module 416 and a second input of the combiner 420. An analyser module output 418 may be connected to a control input of the combiner 420. The combiner output 422 may be connected via a digital to analog converter (not shown) to an amplifier 424. The amplifier output 426 may be connected to a loudspeaker 428.

In operation, the first alert signal generator output 414 provides an alert signal which may be the same as the generator output of alert signal generators 202, 302. The alert signal may be considered to consist of a first (time) alert signal segment consisting of a first number of N samples followed by a second alert signal segment consisting of a second number of M samples. The second alert signal generator output 404 may output only the second segment of the alert signal corresponding to a lead time, which is typically set to be equal to the expected delay from the processing performed by the audio processor 306. In this way, the two signals at the input of the analyser module 416 and of the combination module 420 are synchronous. At the start of the basic chime, a first time segment equal to the lead time is skipped to obtain the second output signal of the generator module 402. This means that for a time equal to the processing time of the non-safe module, the basic chime is played, and that after this time, the enhanced chime is played (if the non-safe partition is functional). If the lead time is sufficiently short (lower than 10 ms), this will not be perceived as two separate signals.

Figure 7:
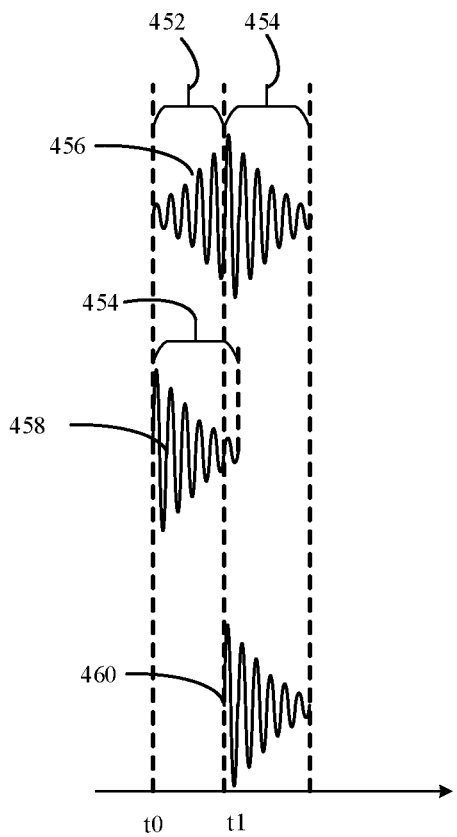
FIG. 7 shows a graph illustrating an example of the waveform generated by the audio system of FIG. 6.

By not outputting the complete alert signal to the processor, the audio system 400 may avoid the use of delay elements to synchronize the alert signal and processed alert signal, as done for example delay modules 208, 308, and/or to provide a look ahead function, as done for example by delay modules 330, 332. The audio system 400 may have a lower latency than audio system 200, 300 due to the absence of synchronisation and lookahead delays, which may be important in safety critical applications. The operation of audio system 400 may be further understood with reference to the graph 450 of FIG. 7 which shows an alert signal 456 having a first segment 452 and second segment 454. The duration of the first segment 452 may correspond to the delay through audio processor 406. At time t0, the alert signal 456 is output on a first output and simultaneously the second segment 454 of the alert signal is output on a second output shown by waveform 458. Waveform 458 is processed by processor 406 and then after time t1 the processed signal is output shown by waveform 460. In this way the portion or segment of the original alert signal is time synchronized with the corresponding portion or segment of the processed alert signal before any combining.

Figure 8:
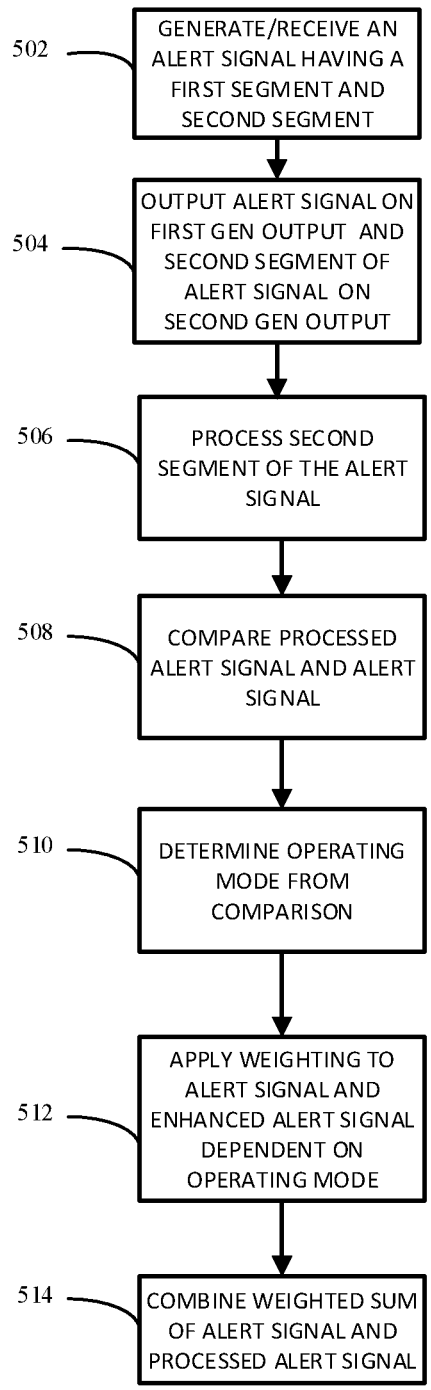
FIG. 8 shows a method of generating an audio alert according to an embodiment.

FIG. 8 shows a method of generating an audio alert 500 by an audio system according to an embodiment, for example audio system 400. In step 502 an alert signal may be generated. The alert signal may have a first segment and a second segment. In step 504 the alert signal may be output from a first output and a second segment of the alert signal may be simultaneously output on a second output. In step 506, the second segment of the alert signal may be processed generate a processed alert signal. In step 508 the processed alert signal may be compared to the alert signal. In some examples, this comparison may be done by a cross-correlation of the processed alert signal with the alert signal or other method. In step 510 an operating mode may be determined from the comparison. For example if the result of the comparison indicates that the processed alert signal has been somehow corrupted, then the operating mode may be considered to be in a first operating mode. Alternatively if the result of the comparison indicates that the processed alert signal has not been corrupted then the operating mode may be considered to be in a second operating mode. A weighting factor may be applied in step 512, dependent on the operating mode. The processed alert signal and the alert signal may be combined with the weighting factor in step 514. For example in the first operating mode the weighting factors may be selected such that the combination of the signal may entirely or almost entirely consist of the alert signal generated in step 502, since the enhanced alert signal is considered to be corrupted, i.e. invalid. In the second operating mode, the weighting factors may be selected such that the combination of the signal may entirely or mostly consist of the processed alert signal generated in step 506, since the enhanced alert signal is valid. In some examples the alert signal and processed alert signals are not combined but instead a selection is made depending on the operating mode.

Embodiments of the audio system and method may be implemented by hardware, software or a combination of hardware and software. In some embodiments, the alert signal output may be a multi-channel output, and may be provided to multiple loudspeakers. In some examples, the audio system may output a mono alert output signal played only on a single channel and loudspeaker in the safe operating mode. For embodiments included in an automotive infotainment system, the loudspeaker used in the safe operating mode may be the closest loudspeaker to the driver, or with a fixed distribution across all loudspeakers. In the normal operating mode the processed alert signal may be processed so that it is louder for the intended user for example the vehicle driver.

Embodiments describe a system and method that combines the safety-compliance of a separate audio system for critical user alerts, with the advanced audio processing that can be performed in the infotainment audio subsystem. This processing may comprise equalisation, dynamic range compression, noise-adaptive volume level, advanced mixing and 3D sound positioning.

In embodiment, the audio processing involved may be performed on several separate partitions. One partition, the safe partition, may be designed compliant to functional safety regulations, and another partition, the non-safe partition, may not necessarily be compliant to functional safety regulations. The basic user alert (e.g., a chime) may be generated in the safe partition. The basic user alert may be provided to the non-safe partition, which processes it to enhance the signal (e.g., cabin or other equalisation, dynamic range compression, noise-adaptive volume level, advanced mixing and 3D sound positioning). The processed alert is provided back to the safe partition. The processed alert is analysed to determine whether or not it has been corrupted. Indeed, if the non-safe partition has crashed, the processed alert could be all zeros, or it could contain random noise. Depending on the outcome of the analysis, the basic alert and processed alert may be combined, and sent to the output (to the amplifier and loudspeakers).

The audio system and method described may guarantee the audio playback of a user alert (a chime), where signal enhancement processing is performed on the user alert (yielding the "enhanced chime") when possible. Since the signal enhancement processing is performed in the non-safe partition, the enhanced chime is only available when this non-safe partition is up and running. Therefore, when the non-safe partition has crashed, has not booted up yet, or is in any other way non-functional, the enhanced chime is not available, and the proposed system will play the basic chime. Otherwise, it will play the enhanced chime. The proposed system may be included in infotainment systems in vehicles, but it is not limited to that field. For example, industrial systems with audio alerts may also use the system and methods described.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of generating an audible alert by a digital audio system configured to operate in a first operating mode and a second operating mode, the method comprising:
generating or receiving, by a first partition of the digital audio system, an alert signal;
outputting, by the first partition, the alert signal to a second partition of the digital audio system;

receiving, by the first partition, a processed alert signal from the second partition, the processed alert signal based on processing in the second partition at least a segment of the alert signal received from the first partition;

analysing the processed alert signal to define whether the digital audio system operates in the first operating mode or the second operating mode; and in the first operating mode, outputting, by the first partition, an alert output signal comprising the alert signal; and in the second operating mode, outputting, by the first partition, an alert output signal comprising the processed alert signal from the second partition;

wherein the first system partition is outside of the second system partition and wherein the digital audio system operates in the first operating mode when the second partition is non-functional based on the analysis of the processed alert signal and operates in the second operating mode when the second partition is functional based on the analysis of the processed alert signal.

2. The method of claim 1, wherein, in the second operating mode, generating the alert output signal further comprises combining the alert signal and the processed alert signal.

3. The method of claim 2, wherein generating the alert output signal further comprises generating a first alert signal segment and a second alert signal segment, and generating the processed alert signal comprises processing the second alert signal segment.

4. The method of claim 2 further comprising:
at least one of (i) delaying the alert signal before the analysing and combining, and (ii) delaying the alert signal and the processed alert signal before the combining.

5. The method of claim 1, wherein analysing the processed alert signal further comprises determining a validity of the processed alert signal.

6. The method of claim 4 further comprising: determining a validity of the processed alert signal from a comparison of the processed alert signal and the alert signal.

7. The method of claim 5, further comprising: determining the validity of the processed alert signal from the cross-correlation of the alert signal and the processed alert signal.

8. The method of claim 5, wherein generating a processed alert signal further comprises replacing at least one bit in a sample of the alert signal with a parity bit, and wherein determining a validity of the processed alert signal comprises checking the parity of the alert signal sample.

9. The method of claim 5, further comprising: configuring the digital audio system in the first operating mode in response to determining that the processed alert signal is invalid, and configuring the digital audio system in the second operating mode in response to determining that the processed alert signal is valid.

10. A digital audio system configured to operate in a first operating mode and a second operating mode, the digital audio system comprising:
an alert signal generator configured to generate an alert signal;
a processor coupled to the alert signal generator and configured to output a processed alert signal by processing at least a segment of the alert signal;
an analyser coupled to the processor and the alert signal generator and configured to analyse the processed alert signal to define whether the digital audio system operates in the first operating mode or the second operating mode;
a combiner coupled to the processor, the alert signal generator and the analyser, the combiner configured in the first operating mode to output an alert output signal comprising the alert signal, and in the second operating mode to output an alert output signal comprising the processed alert signal; and
a first system partition and a second system partition, wherein the alert signal generator, the analyser, and the combiner are located in the first system partition and the processor is located in the second system partition, wherein the first system partition is outside of the second system partition;
wherein the processed alert signal output by the processor in the second system partition is received by the first system partition which is outside of the second system partition and wherein the digital audio system operates in the first operating mode when the second partition is non-functional based on the analysis of the processed alert signal and operates in the second operating mode when the second partition is functional based on the analysis of the processed alert signal.

11. The digital audio system of claim 10, wherein the combiner is further configured to combine the alert signal and the processed alert signal, and to output an alert output signal comprising the combined alert signal and processed alert signal.

12. The digital audio system of claim 10 further comprising:
a first delay module arranged between the alert signal generator output and the combiner and analyser and configured to delay the alert signal before the analysing and combining.

13. The digital audio system of claim 10, wherein the alert signal generator comprises a first alert signal generator output coupled to the combiner and a second alert signal generator output coupled to the processor and wherein the alert signal comprises a first alert signal segment and a second alert signal segment wherein the alert signal generator is configured to output the first alert signal segment followed by the second alert signal segment on the first alert signal generator output and to output the second alert signal segment on the second alert signal generator output.

14. The digital audio system of claim 12 further comprising:
a second delay module arranged between the first delay module and the combiner; and
a third delay module arranged between a processor output and the combiner.

15. The digital audio system of claim 10, wherein the analyser is further configured to determine a validity of the processed alert signal.

16. The digital audio system of claim 15 further configured to determine the validity of the processed alert signal from a cross-correlation of the alert signal and the processed alert signal.

17. The digital audio system of claim 15, wherein the processor is further configured to generate an processed alert signal by adding a parity bit to a processed alert signal sample and to determine the validity of the processed alert signal by a parity check of the processed alert signal sample.

18. A non-transitory computer readable media comprising a computer program comprising computer executable instructions which, when executed by a processor in a digital audio system configured to operate in a first operating mode and a second operating mode, causes the processor to perform a method for generating an audible alert, the method comprising:
- generating or receiving, by a first partition of the digital audio system, an alert signal;
- outputting, by the first partition, the alert signal to a second partition of the digital audio system
- receiving, by the first partition, a processed alert signal from the second partition, the processed alert signal based on processing at least a segment of the alert signal received from the first partition;
- analysing the processed alert signal to define whether the digital audio system operates in the first operating mode or the second operating mode; and
- in the first operating mode, outputting, by the first partition, an alert output signal comprising the alert signal; and
- in the second operating mode, outputting, by the first partition, an alert output signal comprising the processed alert signal from the second partition;
- wherein the first system partition is outside of the second system partition and
- wherein the digital audio system operates in the first operating mode when the second partition is non-functional based on the analysis of the processed alert signal and operates in the second operating mode when the second partition is functional based on the analysis of the processed alert signal.

19. The digital audio system of claim 10, wherein the combiner comprises a respective input arranged to receive a signal from the processor, a signal from the alert signal generator, and an output from the analyser.

* * * * *